US012705568B2

(12) United States Patent
Kung et al.

(10) Patent No.: US 12,705,568 B2
(45) Date of Patent: Aug. 11, 2026

(54) SYSTEMS AND METHODS FOR TRANSACTION ACCEPTANCE MODELING

(71) Applicant: Capital One Services, LLC, McLean, VA (US)

(72) Inventors: Wilson Kung, Westfield, NJ (US); Mark Timms, Philadelphia, PA (US); Lenni Kimawati, Ossining, NY (US); Peter Deng, Flushing, NY (US)

(73) Assignee: Capital One Services, LLC, McLean, VA (US)

(*) Notice: Subject to any disclaimer, the term of this patent is extended or adjusted under 35 U.S.C. 154(b) by 77 days.

(21) Appl. No.: 18/789,829

(22) Filed: Jul. 31, 2024

(65) Prior Publication Data

US 2025/0045686 A1 Feb. 6, 2025

Related U.S. Application Data

(60) Provisional application No. 63/547,439, filed on Nov. 6, 2023, provisional application No. 63/529,997, filed on Jul. 31, 2023.

(51) Int. Cl.
*G06Q 10/0835* (2023.01)

(52) U.S. Cl.
CPC ................................ *G06Q 10/0835* (2013.01)

(58) Field of Classification Search
CPC ................................................. G06Q 10/0835
See application file for complete search history.

(56) References Cited

U.S. PATENT DOCUMENTS

| | | | | |
|---|---|---|---|---|
| 11,842,391 | B2 * | 12/2023 | Wellmann | G06N 20/00 |
| 12,307,332 | B2 * | 5/2025 | Neupane | G06N 20/20 |
| 12,373,790 | B2 * | 7/2025 | Ratnapu | G06Q 10/0875 |
| 2022/0164699 | A1 * | 5/2022 | Neupane | G06N 20/00 |
| 2022/0188805 | A1 * | 6/2022 | Debellis | G06Q 20/065 |
| 2023/0316075 | A1 * | 10/2023 | Cella | G06Q 20/40 |

* cited by examiner

*Primary Examiner* — Paul S Schwarzenberg
(74) *Attorney, Agent, or Firm* — HUNTON ANDREWS KURTH LLP

(57) ABSTRACT

Systems and methods for determining the likelihood of a supplier accepting a certain transaction method such as a payment card. Exemplary systems can generate a machine learning predictive model to determine the likelihood of a supplier accepting a card payment.

20 Claims, 10 Drawing Sheets

SYSTEMS AND METHODS FOR TRANSACTION ACCEPTANCE MODELING

CLAIM OF PRIORITY

This application claims priority from U.S. Provisional Application No. 63/529,997, filed on Jul. 31, 2023, and U.S. Provisional Application No. 63/547,439, filed on Nov. 6, 2023, the disclosures of which are incorporated herein by reference in their entireties.

FIELD OF THE DISCLOSURE

The present disclosure relates to systems and methods for generating a transaction acceptance model and for modeling transaction acceptance.

BACKGROUND

Acceptable transaction methods can vary among different business entities, such as suppliers. Some suppliers may accept credit card for some transactions but not others, whereas other entities may prefer checking for most of their invoices. Accepted transaction methods are not generally disclosed to the public. Thus, buyers are forced to communicate directly with a supplier to ask them for their accepted or preferred transaction methods. Even if the buyer is successful in getting an answer, this method of brute force communication with suppliers is time consuming especially when the buyer is dealing with potentially hundreds or thousands of suppliers. Given the nature of personalization by business, it is time consuming for buyers to call every single one of their suppliers to figure out if each supplier accepts card for their invoice payments. Furthermore, not knowing the acceptability of certain transaction methods may cause the buyer to miss out on a potentially cheaper transaction option, a quicker form of transaction, or even a more secure form of transaction.

These and other deficiencies exist. Thus, there is a present need to provide a system and method for buyers and representatives to predict which suppliers will accept certain transaction methods.

SUMMARY OF THE DISCLOSURE

Aspects of the disclosed embodiments include systems and methods for generating a machine learning predictive model trained to generate a likelihood of a supplier accepting card transaction.

The following embodiments describe systems and methods for training a machine learning predictive model to predict the likelihood of whether a supplier will accept a certain kind of transaction such as a card payment. This likelihood can be called "transaction acceptability." The system can receive one or more inputs associated with information about the suppliers, match these inputs to a parent database, look up the parent database ID, look up one or more model inputs from the parent database including card source information, supplier information, previous information generated from earlier version of the model, and outreach results. Having been trained, the model can automatically predict the transaction acceptability of one or more suppliers.

In some aspects, the techniques described herein relate to a system for generating an artificial intelligence model for predicting transaction acceptability, including: a memory for storing organized data including merchant and transaction data; at least one processor communicatively coupled to the memory and configured to: receive at least one payfile input; generate artificial intelligence model training data by creating a data package including supplier data enriched with card source data and supplier industry data, as well as supplier outreach results data from the at least one payfile input; set a plurality of model weights based on a plurality of connections between a plurality of hidden layers in the artificial intelligence model; analyze, via the artificial intelligence model, the artificial intelligence model training data with the plurality of model weights; adjust the plurality of model weights based on an output of the analysis; generate a finalized artificial intelligence model based on the output of the analysis and adjusted plurality of model weights; and generate at least one transaction acceptability prediction with the finalized artificial intelligence model.

In some aspects, the techniques described herein relate to a system, wherein the generated transaction acceptability prediction is updated in real-time based on an updated payfile input.

In some aspects, the techniques described herein relate to a system, wherein the transaction acceptability prediction is generated for a supplier without historical transaction data.

In some aspects, the techniques described herein relate to a system, wherein the acceptability prediction is generated for a discrete transaction.

In some aspects, the techniques described herein relate to a system, wherein the at least one payfile input is converted into a standardized format.

In some aspects, the techniques described herein relate to a system, wherein the supplier outreach results data includes results of one or more of (1) a prior attempt to determine a supplier transaction acceptability and (2) a prior payment attempt.

In some aspects, the techniques described herein relate to a system, wherein the card source data includes one or more of (1) records of supplier transactions, (2) records of historical transactions between a supplier and a buyer, and (3) one or more unique values used to categorize the supplier data.

In some aspects, the techniques described herein relate to a system, wherein the supplier industry data includes a North American Industry Classification System code.

In some aspects, the techniques described herein relate to a method for generating an artificial intelligence model for predicting transaction acceptability, including: receiving, via a processor, at least one payfile input; generating, via the processor, artificial intelligence model training data by creating a data package including supplier data enriched with card source data and supplier industry data, as well as supplier outreach results data from the at least one payfile input; setting, via the processor, a plurality of model weights based on a plurality of connections between a plurality of hidden layers in the artificial intelligence model; analyzing, via the artificial intelligence model, the artificial intelligence model training data with the plurality of model weights; adjusting, via the processor, the plurality of model weights based on an output of the analysis; generating, via the processor, a finalized artificial intelligence model based on the output of the analysis and adjusted plurality of model weights; and generating, via the processor, at least one transaction acceptability prediction with the finalized artificial intelligence model.

In some aspects, the techniques described herein relate to a method, wherein the generated transaction acceptability prediction is updated in real-time based on an updated payfile input.

In some aspects, the techniques described herein relate to a method, wherein the transaction acceptability prediction is generated for a supplier without historical transaction data.

In some aspects, the techniques described herein relate to a method, wherein the acceptability prediction is generated for a discrete transaction.

In some aspects, the techniques described herein relate to a method, wherein the at least one payfile input is converted into a standardized format.

In some aspects, the techniques described herein relate to a method, wherein the supplier outreach results data includes results of one or more of (1) a prior attempt to determine a supplier transaction acceptability and (2) a prior payment attempt.

In some aspects, the techniques described herein relate to a method, wherein the card source data includes one or more of (1) records of supplier transactions, (2) records of historical transactions between a supplier and a buyer, and (3) one or more unique values used to categorize the supplier data.

In some aspects, the techniques described herein relate to a method, wherein the supplier industry data includes a North American Industry Classification System code.

In some aspects, the techniques described herein relate to a non-transitory computer-accessible medium having stored thereon computer-executable instructions wherein, when a computer hardware arrangement executes the instructions, the computer hardware arrangement is configured to perform procedures including: receiving, via a processor, at least one payfile input; generating, via the processor, artificial intelligence model training data by creating a data package including supplier data enriched with card source data and supplier industry data, as well as supplier outreach results data from the at least one payfile input; setting, via the processor, a plurality of model weights based on a plurality of connections between a plurality of hidden layers in the artificial intelligence model; analyzing, via an artificial intelligence model, the artificial intelligence model training data with the plurality of model weights; adjusting, via the processor, the plurality of model weights based on an output of the analysis; generating, via the processor, a finalized artificial intelligence model based on the output of the analysis and adjusted plurality of model weights; and generating, via the processor, at least one transaction acceptability prediction with the finalized artificial intelligence model.

In some aspects, the techniques described herein relate to a non-transitory computer-accessible medium, wherein the generated transaction acceptability prediction is updated in real-time based on an updated payfile input.

In some aspects, the techniques described herein relate to a non-transitory computer-accessible medium, wherein the transaction acceptability prediction is generated for a supplier without historical transaction data.

In some aspects, the techniques described herein relate to a non-transitory computer-accessible medium, wherein the acceptability prediction is generated for a discrete transaction.

These and other objects, features and advantages of the exemplary embodiments of the present disclosure will become apparent upon reading the following detailed description of the exemplary embodiments of the present disclosure, when taken in conjunction with the appended claims

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
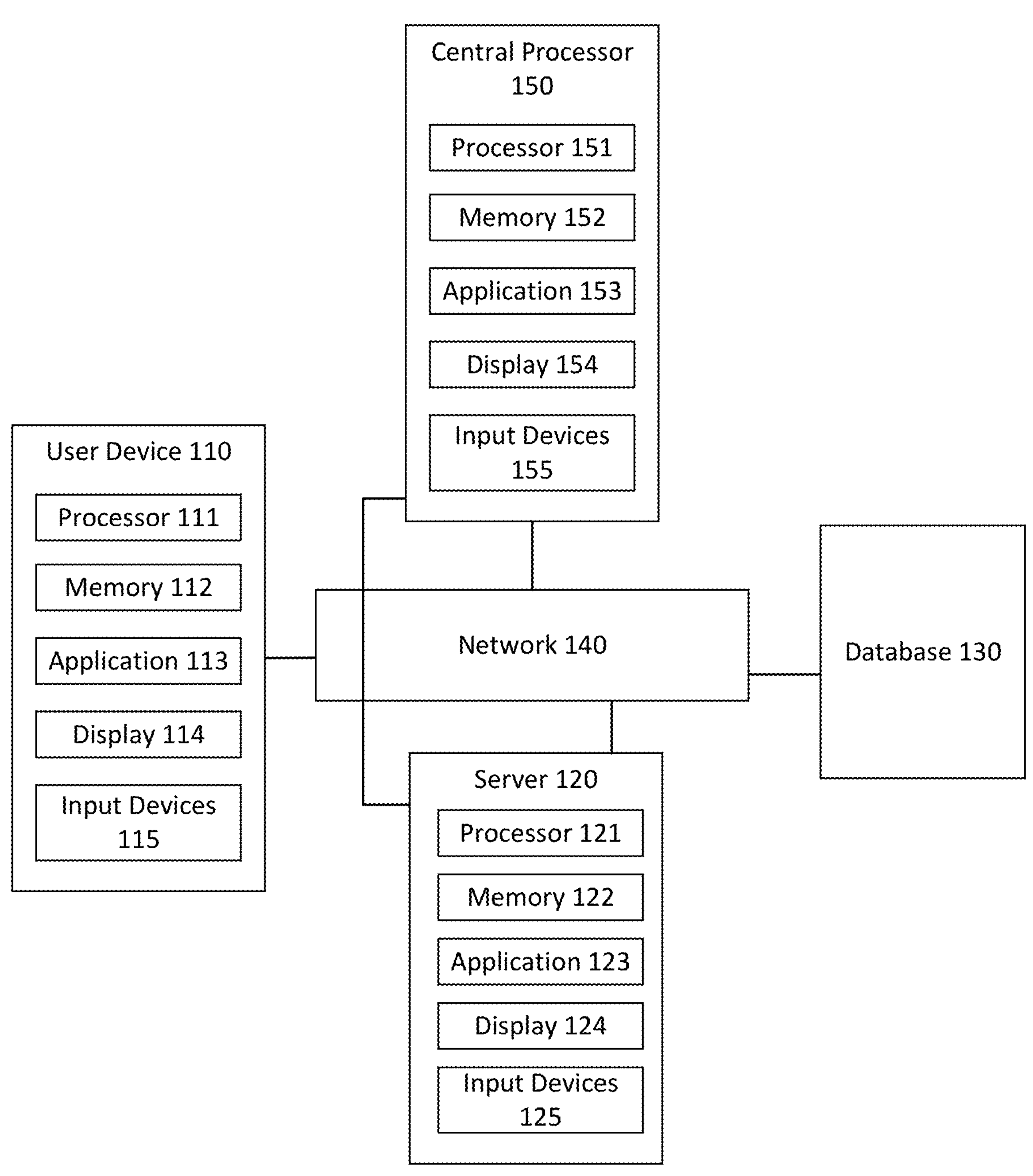
FIG. 1 illustrates a system according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features, advantages, and characteristics of an embodiment. In other instances, additional features, advantages, and characteristics may be recognized in certain embodiments that may not be present in all embodiments. One skilled in the relevant art will recognize that the features, advantages, and characteristics of any embodiment can be interchangeably combined with the features, advantages, and characteristics of any other embodiment.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In a typical business transaction ecosystem, there are three parties involved: the buyer (the entity making the payment), the supplier (the entity receiving the payment), and the transaction provider (the provider that facilitates the transfer of payment from the buyer to the supplier). There are multiple transaction options available in such an ecosystem, including check, automated clearing house (ACH), wire transfers, credit card, real time payments (RTP), and still others. Buyers, suppliers, and transaction providers may benefit by using a specific transaction option. For example, a buyer may prefer to use a credit card to maximize reward points. A supplier may prefer a fast, secure transaction method like ACH to maximize predictable cash flow.

Unfortunately, transaction acceptance terms are nuanced and can differ not only for every supplier, but also for every supplier-to-buyer relationship. Thus, there is currently a need for a solution that helps business entities determine transaction acceptability of suppliers, buyers, etc.

Some efforts have been made to provide such a solution, but each has its drawbacks. For example, some business entities rely on human-based operations such as calling agents tasked with calling every business entity and inquiring about their accepted transaction methods. Though this method may work on a very small scale, ultimately this requires too much time and manual effort for any business of significant scale.

Other past efforts have focused on data-driven solutions such as matching supplier information against a set of data sources of known transaction acceptances, then building a business logic to make an educated guess on which business entities will accept a card. For example, current business rules typically determine transaction acceptability by first determining a buyer's current method of paying the supplier, then working with the buyers to estimate total annual spend at the supplier. Then, the buyer can lookup the intersection of transaction methods and spend amount on a grid of acceptance probabilities derived from business intuition. This result found on the lookup table can be the supplier's transaction acceptability. But though this leverages past data, such an educated guess, may be accurate only for certain buyers, depends solely on the given dataset, and does not solve for a new supplier in the transaction ecosystem.

The present embodiments provide a new solution that improves on past systems and methods. The embodiments provide for a machine learning model based predictive modeling. The model can predict transaction acceptance from a business entity such as a supplier based on model prediction factors. Such a model is intended to be automated, real-time, and easily scalable. Furthermore, the exemplary model can be utilized on a more granular level than previous methods, e.g. the model can be used on a granular transaction level rather than on a network level. Crucially, the present models can also predict transaction acceptability of an entity with zero previous encounters, e.g. a new supplier. Compared to existing methods and conventional systems, the new modeling system is more precise and has greater recall. For example, in an exemplary test performed with the exemplary model and conventional business rules, the model conducted 92.4% coverage, 0.76 precision, and 0.85 recall. Whereas conventional business rules conducted only 65.6% coverage and 0.59 precision. Note that precision here was defined as (true positive)/(true positive+false positive), and recall was defined as (true positive)/(true positive+false negative). Also note that the conventional business rules only identified suppliers that it had already believed to accept payments, so it therefore did not have false negatives.

The likelihood that an entity will accept a card as a transaction method can be called the "transaction acceptability" of a supplier or similar entity. Generally, it is difficult to predict the transaction acceptability of any one supplier. For example, card acceptance is nuanced and can vary based on different terms and relationships between the buyer and supplier. A supplier might accept card transactions for some buyers but not others, e.g. they might accept card transactions from their monthly buyer but not for the one-time technology consultant. This problem is further complicated by the size of the supplier, the size of the invoice, the type of goods or services being provided, or even the reputation of the buyer.

The model can use at least the following inputs: supplier industry; competitiveness in the supplier industry; industry-to-industry spend; supplier outreach results; geocoding of location; known card acceptance from internal sources; known card acceptance from external sources; invoice transaction amounts; buyer level firmographics; financial ratios and/or margins; and/or graph technology-based embeddings. Card source information can include information from a card acceptance dataset including data regarding historical data about commercial card transactions. Supplier industry can describe the industry of the supplier potentially represented as a six-digit merchant identifier such as a North American Industry Classification System (NAICS) code. Outreach results can include results of any previous outreach attempts to the supplier, including phone calls, emails, or other communication with the supplier querying their transaction acceptability. These outreach results can be aggregated in a database. Calculating industry competitiveness can comprise identifying all businesses in an industry; counting the number of businesses in each industry; calculating the rank ordering of each industry according to the number of businesses it contains; and ultimately use this rank ordering as a measure of industry competitiveness. Each of the inputs will provide a more accurate transaction acceptability prediction.

These new systems and methods provide a unique way to take past supplier outreach results to score (via Bayesian modeling) the transaction acceptability of a supplier. This model also provides real time updates without necessarily updating the machine learning model. Furthermore, the system is novel in the way that it identifies small versus large businesses (e.g. residential versus commercial types). The described algorithm calculates industry competitiveness in a new and unique way: it identifies all businesses in an industry; counts the number of businesses in each industry; calculates the rank ordering of each industry according to the number of businesses it contains; and measures the competitiveness of each industry using this rank ordering. Additionally, the described algorithm provides real time updating of the transaction acceptability score without refitting the model itself. For example, the regression model is fitted to the training dataset in order to generate a prior transaction acceptability score. Then, the updated supplier transaction acceptance information is collected. Next, Bayesian updating is used to combine the prior transaction acceptability score without the updated transaction acceptance information that was just collected. Using the results of this Bayesian updating, the new supplier transaction acceptability score is generated.

To better incorporate data structure into the generation of the predictive model and the ultimate prediction of transaction acceptability, the model can use Bayesian Hierarchical Modeling. Bayesian hierarchical modeling is a statistical approach used to analyze complex data structures that involve nested or hierarchical relationships. It combines Bayesian statistics with hierarchical modeling techniques to make inferences about the underlying parameters of the data and their relationships. Bayesian hierarchical modeling allows researchers to incorporate prior knowledge or beliefs about the parameters of interest through the specification of prior distributions. This is particularly useful when dealing with small sample sizes or when there is previous information available about the data. In other embodiments, the models described herein can use tree models. Tree models are a type of predictive modeling technique that uses decision trees to make predictions and decisions based on input data. The tree models split the data into subsets by making decisions at each node of the tree based on the features or attributes of the data. Each node represents a decision or a test on a particular feature, and the branches emanating from the node correspond to the possible outcomes of that test. The process continues recursively until a stopping criterion is met, such as reaching a maximum tree depth, a minimum number of samples per leaf, or a minimum improvement in model performance. Categories of tree models can include without limitation classification trees, regression trees, and ensemble methods such as random forests and gradient boosting machines (GBM). Though reference has been made to only a number of models, it is understood that the systems and methods described herein can incorporate other models such has other regression models.

In sum, the transaction acceptability predictive model uses machine learning to assess the probability that a supplier will accept credit card as a transaction method for a business-to-business invoice. The use of machine learning improves on the current methodology of using outreach agents to individually call suppliers to determine card acceptance.

Additionally, the transaction acceptability prediction can be updated without refitting the model, in some embodiments. For example, the system can fit a regression model to the training dataset to generate a prior score or prior transaction acceptability likelihood. Next, the system can collect updated supplier transaction acceptability information. Using Bayesian updating, the system can combine the prior score with the updated acceptance information. With this new information, the results of the update acceptance can become the new transaction acceptability score for the supplier.

In other embodiments, the supplier information inputs can be processed prior to being fed into the model. For example, the supplier information can undergo standardization and cleaning, e.g. a supplier's address can be changed into a standardize format. Next, the supplier information can be matched to an existing file in the business database. For example, a supplier address may be matched with an address on record or at least with another supplier with multiple locations. If such a match is found, then pre-processing can be complete. If a match is not found at this stage, then the system can search for other supplier information that may lead to a match. For example, the database can be searched for a phone number, name, city, state, or other identifying information.

FIG. 1 illustrates a system 100 according to an exemplary embodiment. The system 100 may comprise a user device 110, a server 120, a database 130, a network 140, and a central processor 150. Although FIG. 1 illustrates single instances of components of system 100, system 100 may include any number of components.

System 100 may include a user device 110. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. A wearable smart device can include without limitation a smart watch.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the user device 110. In some examples, the user device 110 may execute one or more applications, such as software applications, that, for example, enable network communications with one or more components of the system 100, transmit and/or receive data, and perform the functions described herein. Upon execution by the processor 111, the application 113 may perform the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder.

These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. The server 120 can communicate with the central processor 150 directly or over the network 140.

The server 120 may include a processor 121, a memory 122, and an application 123. The processor 121 may be a processor, a microprocessor, or other processor, and the server 120 may include one or more of these processors. The server 120 can be onsite, offsite, standalone, networked, online, or offline.

The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications comprising instructions for execution on the server 120. In some examples, the server 120 may execute one or more applications, such as software applications, that, for example, enable network communications with one or more components of the system 100, transmit and/or receive data, and perform the functions described herein. Upon execution by the processor 121, the application 123 may perform the functions described in this specification, specifically to execute and perform the steps and functions in the process flows described below. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

System 100 may include a database 130. The database 130 may be one or more databases configured to store data, including without limitation, private data of users, financial accounts of users, identities of users, transactions of users, and certified and uncertified documents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120. Additionally, the database 130 can be hosted internally or externally by the central processor 150.

System 100 may include one or more networks 140. In some examples, the network 140 may be one or more of a wireless network, a wired network or any combination of wireless network and wired network, and may be configured to connect the user device 110, the server 120, and the database 130. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

The central processor 150 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. The central processor 150 can communicate with the server 120 directly or over the network 140.

The central processor 150 may include a processor 151, a memory 152, and an application 153. The processor 151 may be a processor, a microprocessor, or other processor, and the central processor 150 may include one or more of these processors.

The processor 151 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 151 may be coupled to the memory 152. The memory 152 may be a read-only memory, write-once read-multiple memory or read/write memory, e.g., RAM, ROM, and EEPROM, and the central processor 150 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 152 may be configured to store one or more software applications, such as the application 153, and other data, such as user's private data and financial account information.

The application 153 may comprise one or more software applications comprising instructions for execution on the central processor 150. In some examples, the central processor 150 may execute one or more applications, such as software applications, that, for example, enable network communications with one or more components of the system 100, transmit and/or receive data, and perform the functions described herein. Upon execution by the processor 151, the application 153 may perform the functions described in this specification, specifically to execute and perform the steps and functions in the process flows described below. Such processes may be implemented in software, such as software modules, for execution by computers or other machines. The application 153 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The central processor 150 may further include a display 154 and input devices 155. The display 154 may be any type of device for presenting visual information such as a computer monitor, a flat panel display, and a mobile device screen, including liquid crystal displays, light-emitting diode displays, plasma panels, and cathode ray tube displays. The input devices 155 may include any device for entering information into the central processor 150 that is available and supported by the central processor 150, such as a touch-screen, keyboard, mouse, cursor-control device, touch-screen, microphone, digital camera, video recorder or camcorder. These devices may be used to enter information and interact with the software and other devices described herein.

Figure 2A:
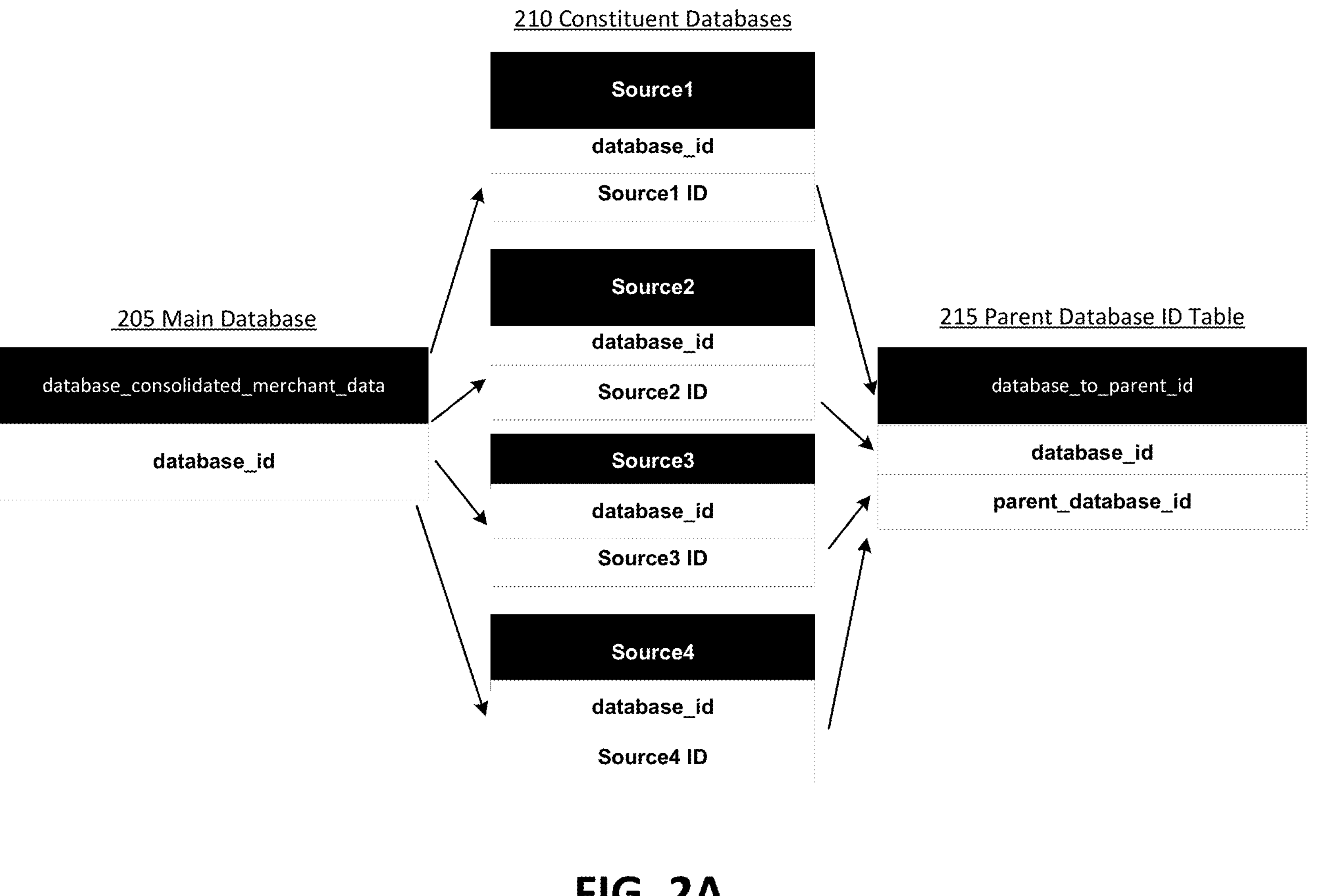
FIGS. 2A-2C are method flowcharts illustrating processes according to an exemplary embodiment.
Figure 2B:
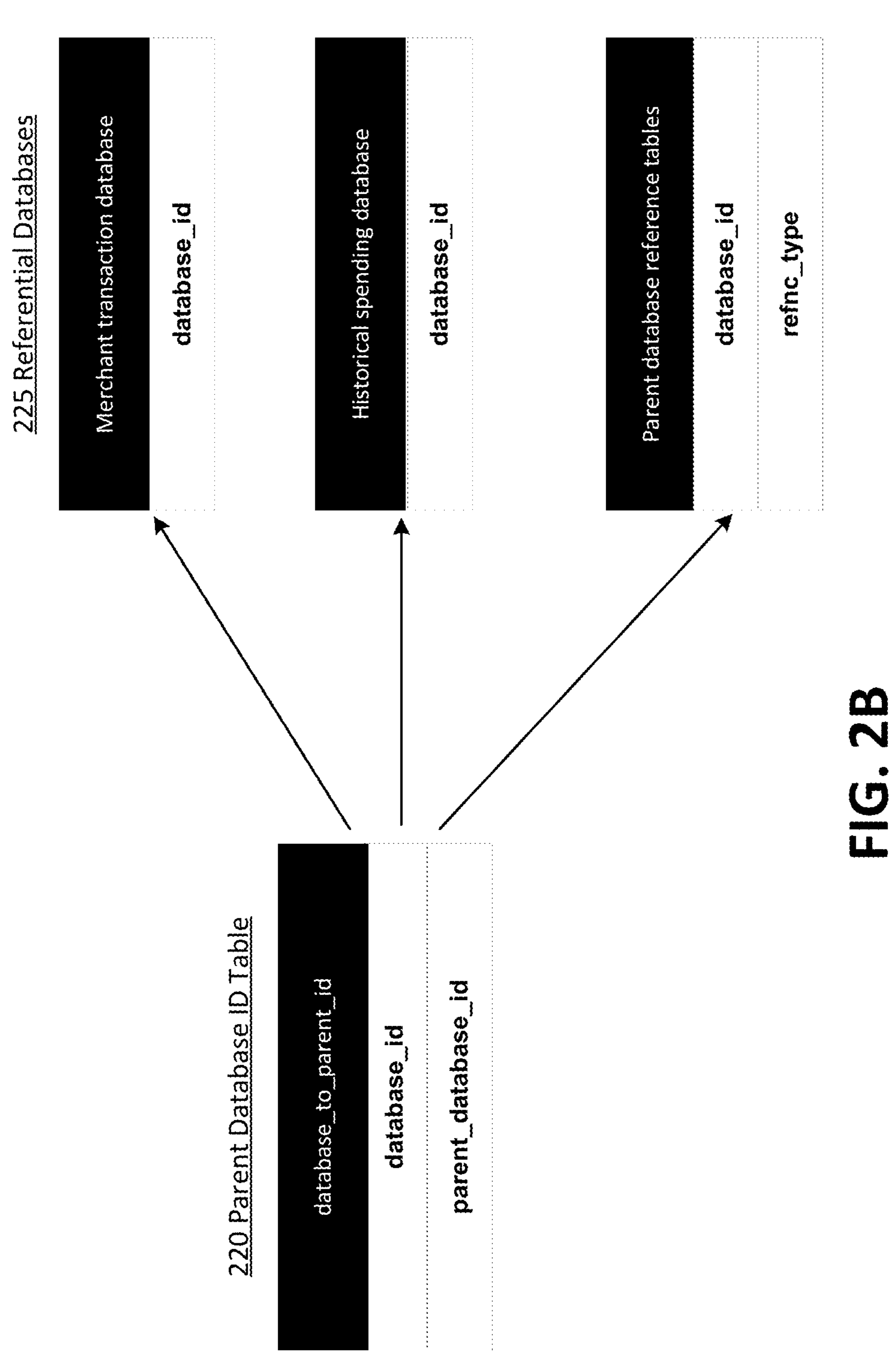
Figure 2C:
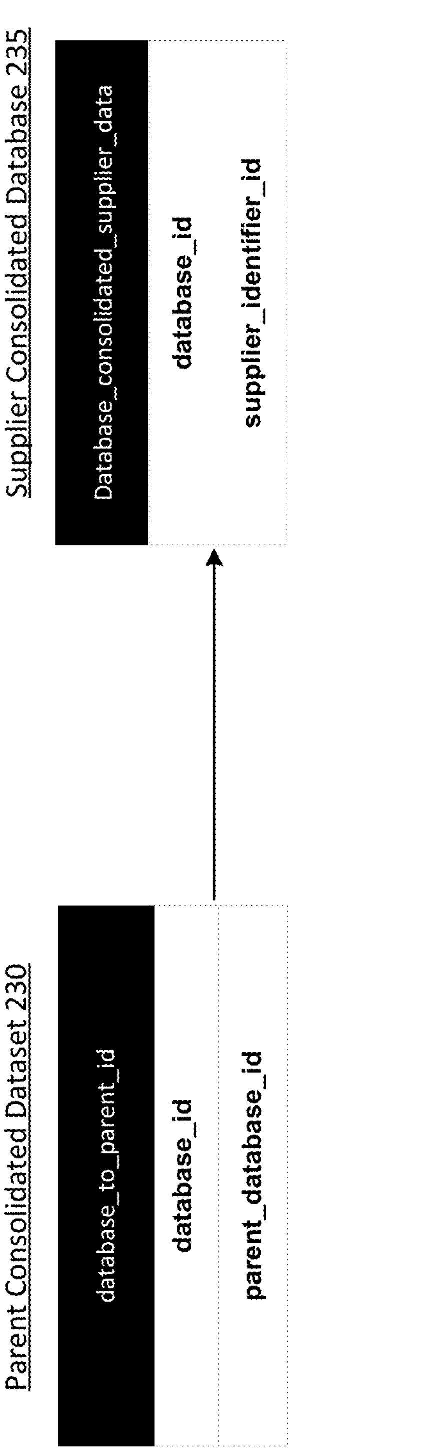

FIGS. 2A-2C are method flowcharts that describe the process of creating a database of the inputs which will be used to train the transaction acceptability model and ultimately generate a transaction acceptability prediction. Referring to FIG. 2A, a new table "Parent Database ID table" 215 is formed by combining data from the main database 205 with the data from its various constituent data sources 210 including without limitation Source1, Source2, Source3, and Source4. The source ID refers to the database id of a location of the supplier. Thus, each physical location of a supplier has an assigned database id called a source ID. The parent id database table 215 is created in order to aggregate the location specific database ids into a common identifier. For example, a supplier may have several different locations 1, 2, 3, and 4. The database 205 can store these locations as source IDs such as Source1 ID, Source2 ID, Source3 ID, and Source4 ID per 210. These source IDs can be combined into a parent database id in 215 so that information about the supplier can be looked up as a whole and as an group of individual locations. During this process, the various data from the parent database ID may be cleaned or otherwise standardized in preparation for being inputs into a predictive model. The parent database_id can be used by the model to retrieve information about a specific supplier. That is, whenever the model is tasked with generating a transaction acceptability prediction about a specific supplier, the model can reference the parent_database_id took up historical data on the supplier.

Referring to FIG. 2B, the card source input is computed by joining the combined parent database ID table 220 with one or more referential databases 225 such as a merchant transaction database (database_merchant_trxn_mapping), a historical spending database (database_spending), and one or more parent database reference tables (database_references). The merchant transaction database can include at least records of various transactions processed by a merchant or supplier. Each record in the database will contain specific details about individual transactions. This includes a unique transaction ID, date and time of the transaction, and any relevant timestamps. Information about the customer involved in the transaction, such as customer ID, name, contact details, and any other relevant customer identifiers can also be included. If the transaction involves an order or invoice, information about the order number or invoice ID and any associated terms may be included. The historical spending database can include records of past financial transactions made between a supplier and a buyer. The parent database reference table can include one or more unique values used to standardize categorize data in the parent database. By joining the parent database with each of these referential databases, the card source lookup can determine if any card acceptance data references one or more suppliers.

This process helps enrich the data available in the parent database ID table with additional information from the constituent data sources, providing a more complete and detailed view of the data for analysis, reporting, or other purposes. It allows organizations to consolidate and leverage data from multiple sources in a unified manner, facilitating more informed decision-making and deeper insights into the data.

Referring to FIG. 2C, the industry associated with a supplier can be found by identifying a merchant code such as an NAICS code within the parent consolidated dataset 230 to arrive at a supplier consolidated database 235.

The present application utilizes a predictive model to predict transaction acceptability and/or the likelihood of transaction acceptability of a particular supplier. In some examples, the predictive model can be implemented through a logistic regression model with a plurality of inputs.

In some examples, the plurality of inputs can comprise card source data, supplier industry data, and outreach result data. For example, the card source data can identify which, of any, card acceptance dataset contains a particular supplier. Exemplary datasets can include, without limitation, commercial card transactions, transactions for a particular type of card, and check-in and/or transaction location data. As another example, the card source data can comprise the entity issuing the card (e.g., a financial institution, a merchant, and card networks) or the entity providing the card (e.g., a card manufacturing entity).

The supplier industry data can comprise an identifier, such as a NAICS code, and suppliers within an industry frequently have similar levels of transaction acceptability. The outreach result data can comprise the results of any previous outreach attempts to the supplier (e.g., prior attempts to determine transaction acceptability, prior acceptances or declines of transaction acceptability). In some examples, outreach results are aggregated at the parent database ID level. Additional details regarding the predictive model are described with reference to FIGS. 4-5.

Figure 3:
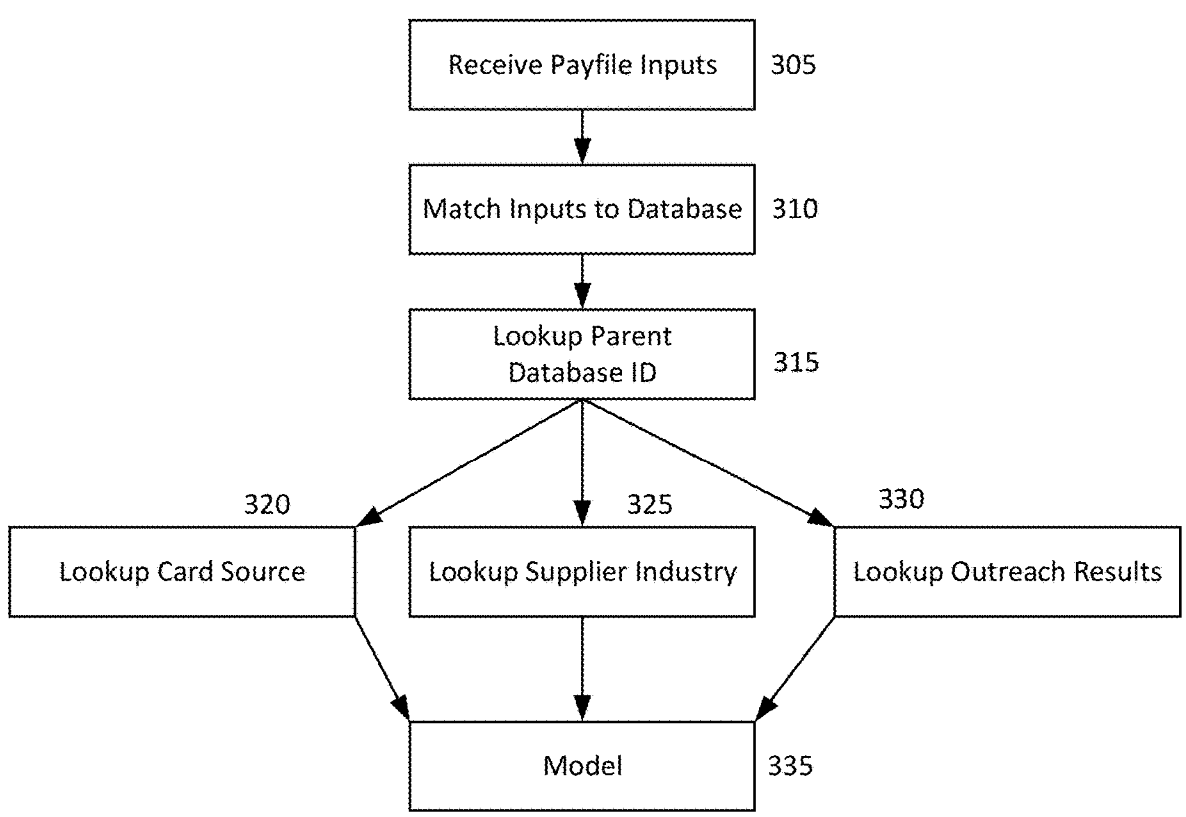
FIG. 3 is a method flowchart illustrating a process according to an exemplary embodiment.

FIG. 3 is a method diagram illustrating a process 300 according to an example embodiment. Process 300 can be performed by one or more of the components of system 100, including the user device 110, the server 120, the database 130, and/or the central processor 150.

The process 300 can begin with action 305 where one or more payfile inputs are received. The one or more payfile inputs can include, without limitation, supplier contact information such as name and address, transaction terms, and estimated annual spend amount between the buyer and supplier.

Following receipt of the one or more payfile inputs, in action 310 the one or more payfile inputs can be matched to database. For example, the one or more payfile inputs can be matched with corresponding data previously stored in the database.

In action 315, a lookup of the parent dataset identifier (ID) can be performed. This can comprise one or more additional actions, including, for example, a lookup of a card source (action 320), a lookup for a supplier industry (action 325), and a lookup of outreach results (action 330). Data lookups can be performed through the use of lookup tables, database queries (e.g., an SQL query), and/or any combination thereof. The data lookups can be performed on demand or on a periodic basis (e.g., daily, weekly, monthly).

In action 335, the data obtained from the database is provided to the predictive model.

Figure 4:
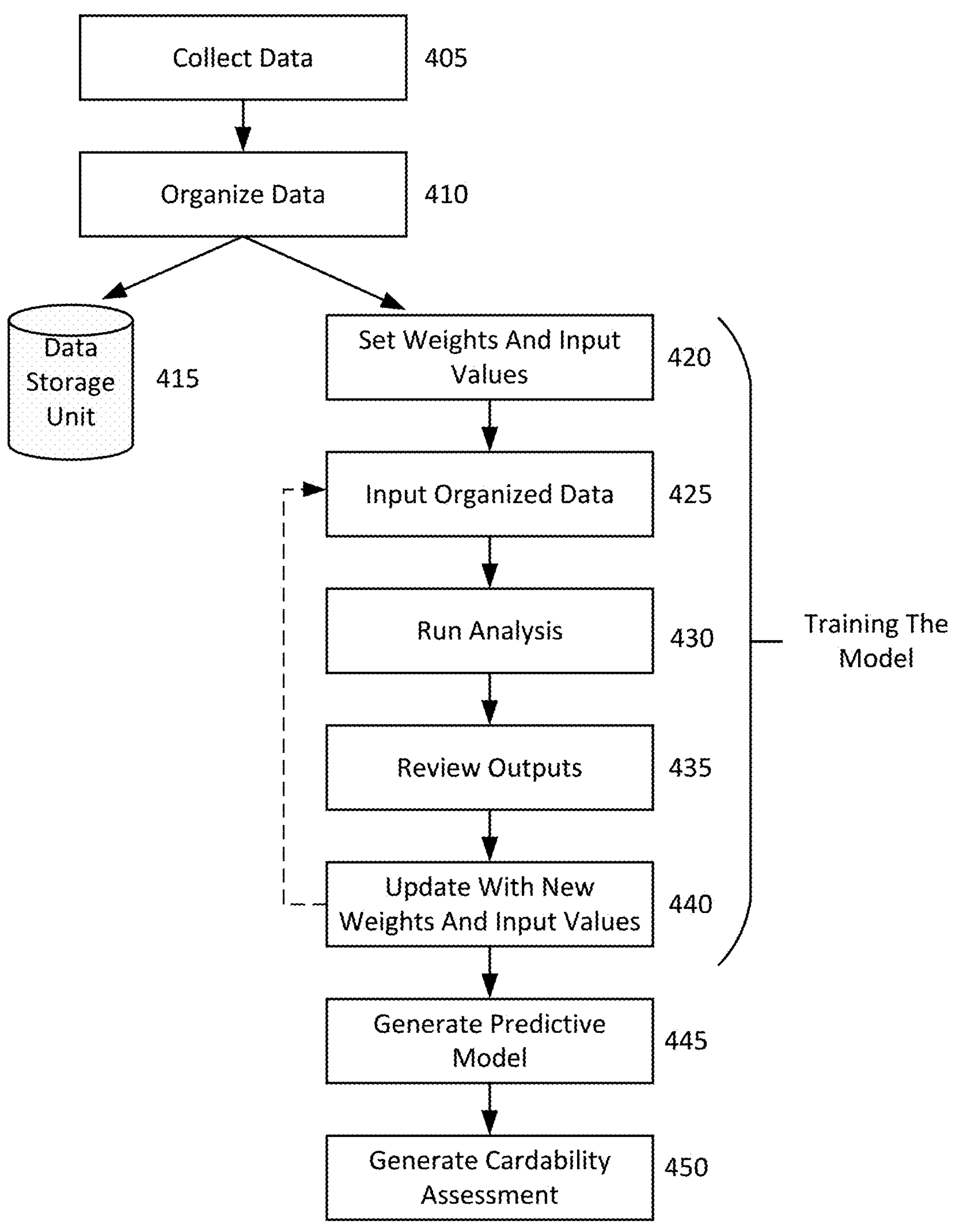
FIG. 4 is a method flowchart illustrating a process according to an exemplary embodiment.

FIG. 4 is a flowchart illustrating the generation of a predictive model and the generating of a transaction acceptability assessment. The process 400 describes the training process for an exemplary predictive model suitable for the predicting and generating of one or more transaction acceptability assessments including at least a grade of whether a merchant is likely to accept a payment card. The process can begin with action 405 when data is collected. The raw data can be associated with the user device and the online transaction itself. The information can further include card acceptance history; card source, supplier industry; outreach results; invoice history; and binomial distributions regarding the card acceptance of the merchant.

Once the data has been collected, the central processor can transmit the data to the server. The data may have been previously gathered and stored in a database or data storage unit in which case the central processor application can retrieve the data from the data storage unit. The data can be received continuously or in batches. The raw data can be updated at any time. At action 410, the central processor application can organize the raw data into discernable categories including but not limited to card acceptance history and merchant category. The categories can be predetermined by the user or created by the predictive model. At action 415, the organized data can be transmitted to the data storage unit. The data storage unit can be associated with the central processor or server including a cloud server. The raw or organized data can be transmitted over a wired network, wireless network, or one or more express buses. Upon organizing the data into one or more categories, the server can proceed with training the predictive model in actions 420 through 440. The training portion can have any number of iterations. The predictive model can comprise one or more neural networks described with further reference to FIG. 5.

The training portion can begin with action 420 when the weights and input values are set by the user or by the model itself. Furthermore, the weights can be the predetermined connections between the inputs and the hidden layers described with further reference to FIG. 5. The input values are the values that are fed into the neural network or predictive model. The input values may be discerned by the different categories created in action 410, although other distinct input values may be discerned. The inputs can include without limitation card acceptance history; invoice history; and binomial distributions regarding the card acceptance of the merchant.

In action 425, the data is inputted in the neural network, and in action 430 the neural network analyzes the data according to the weights and other parameters set by the user. In action 435, the outputs are reviewed. The outputs can include one or more transaction acceptability assessments varying from likely to accept card transaction to unlikely to accept card transaction. In other embodiments, the server may only grade for low risk or high risk. In still other embodiments, the server generates a numerical score or letter grade each with discrete value.

In action 440, the predictive model may be updated with new data and parameters. The new data can be collected by the server in a similar fashion to actions 405 and 410. Though it is not necessary in this exemplary embodiment to retrain the predictive model, the predictive model can be re-trained any number of times such that actions 425 through 440 are repeated until a satisfactory output is achieved or some other parameter has been met. As a nonlimiting example, the server may update the inputs with new transaction profile data. As another nonlimiting example, the server can adjust the weighted relationship between the input layer and the one or more hidden layers of a neural network discussed with further reference to FIG. 5. If a satisfactory output has been recorded, then in action 445 one or more predictive models can be generated. It is understood that the predictive model, once generated, can undergo further training like actions 420 to 445. Having generated the predictive model, in action 450 the model can generate one or more transaction acceptability assessments given the unique input values collected from a merchant.

Figure 5:
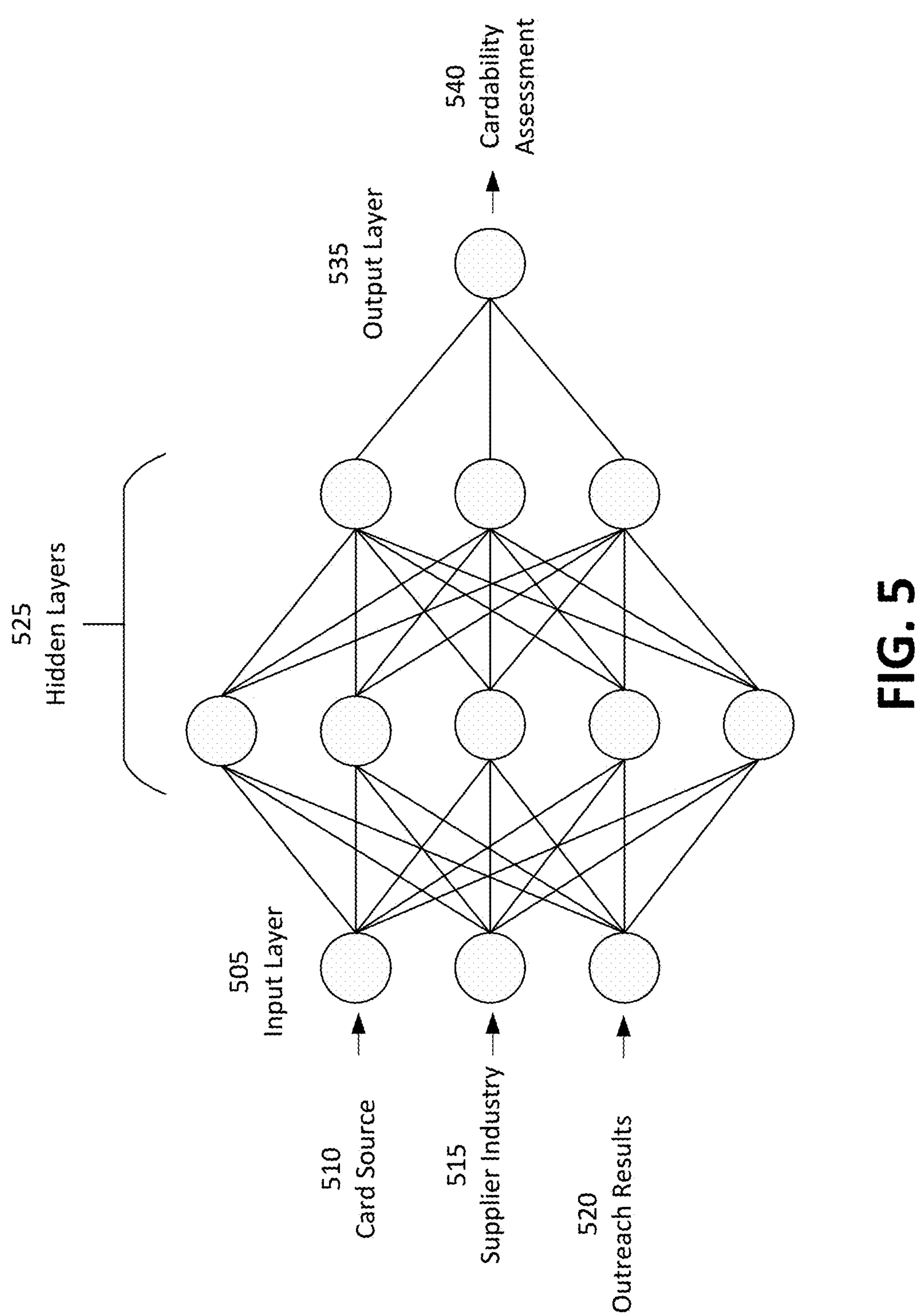
FIG. 5 is a diagram illustrating a neural network according to an exemplary embodiment.

FIG. 5 is a diagram illustrating a neural network as an exemplary embodiment for the predictive model. A neural network is a series of algorithms that can, under predetermined training restrictions, recognize relationships between one or more variables. A neuron in a neural network is a mathematical function that collects and classifies information according to a specific form set by a user. A neural network can be divided into three main components: an input layer, a processing or hidden layer, and an output layer. The input layer comprises data sets chosen to be inserted into the neural network for analysis. The hidden layers include one or more neurons that can classify the inputs according to parameters set by the user. The hidden layers can comprise multiple successive layers, the first layer positioned immediately after the input layer and the last layer positioned immediately before the output layer. The hidden layer immediately after the input layer may be connected to the input layer via a predetermined weight or emphasis. These weights can be assigned according to the modeler's agenda. Alternatively, the model itself can determine the optimal weights between layers such that a predetermined outcome, margin of error, or minimum data point is achieved.

The predictive model can comprise a neural network 500. The neural network may be integrated into the central processor, the server, or some other computer device suitable for neural network analysis. In some embodiments, the server can generate and run the neural network 500. The neural network can include an input layer 505, one or more hidden layers 525, and an output layer 535. Although only a certain number of nodes are depicted in FIG. 5, it is understood that the neural network according to the disclosed embodiments may include less or more nodes in each layer. Additionally, the hidden layers can include more or less layers than what is depicted in FIG. 5. It is also understood that the connections between each layer may be assigned a predetermined weight according to the central processor's manual change or according to some weight value generated by the neural network itself. The input layer may include sets of data gathered from outside sources. The neural network can include as inputs a card source 510, supplier industry 515, and outreach results 520. Upon analyzing the inputs via the one or more hidden layers, the neural network can create one or more transaction acceptability assessments 540. The transaction acceptability assessment can be expressed as a discrete number such as a percentage or as a binomial 1 or 0, e.g. a YES (card is accepted) or NO (card is not accepted). Furthermore, the neural network can be configured to generate a percentage, then determine whether that percentage is over a predetermined threshold, e.g. 70% confidence in transaction acceptability. If the percentage is below, the ultimate determination is NO; if the percentage is above, then ultimate determination is YES. Therefore, it is understood that other qualities of the supplier transaction method may be considered when training the model and ultimately generating a transaction acceptability determination. It is understood that one or more neural networks or some combination of neural networks can be trained according to individual users. It is understood that any of the neural networks described herein may be trained or iterated any number of times. In some embodiments, the neural network can be re-trained and/or updated after every recordation of new card acceptance queries posed to one or more merchants. In still other embodiments, the neural network can be trained until a sufficient level of accuracy has been reached. Furthermore, the neural networks can be trained to arrive at any number of conclusions, including what other transaction methods may be accepted by the merchant based on the inputs provided.

In some embodiments, the application can analyze document information using a predictive model including without limitation a recursive neural network (RNN), convolutional neural network (CNN), artificial neural network (ANN), or some other neural network. The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The exemplary system, method and computer-readable medium can utilize various neural networks, such as CNNs or RNNs, to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks (LSTMs) and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

Figure 6:
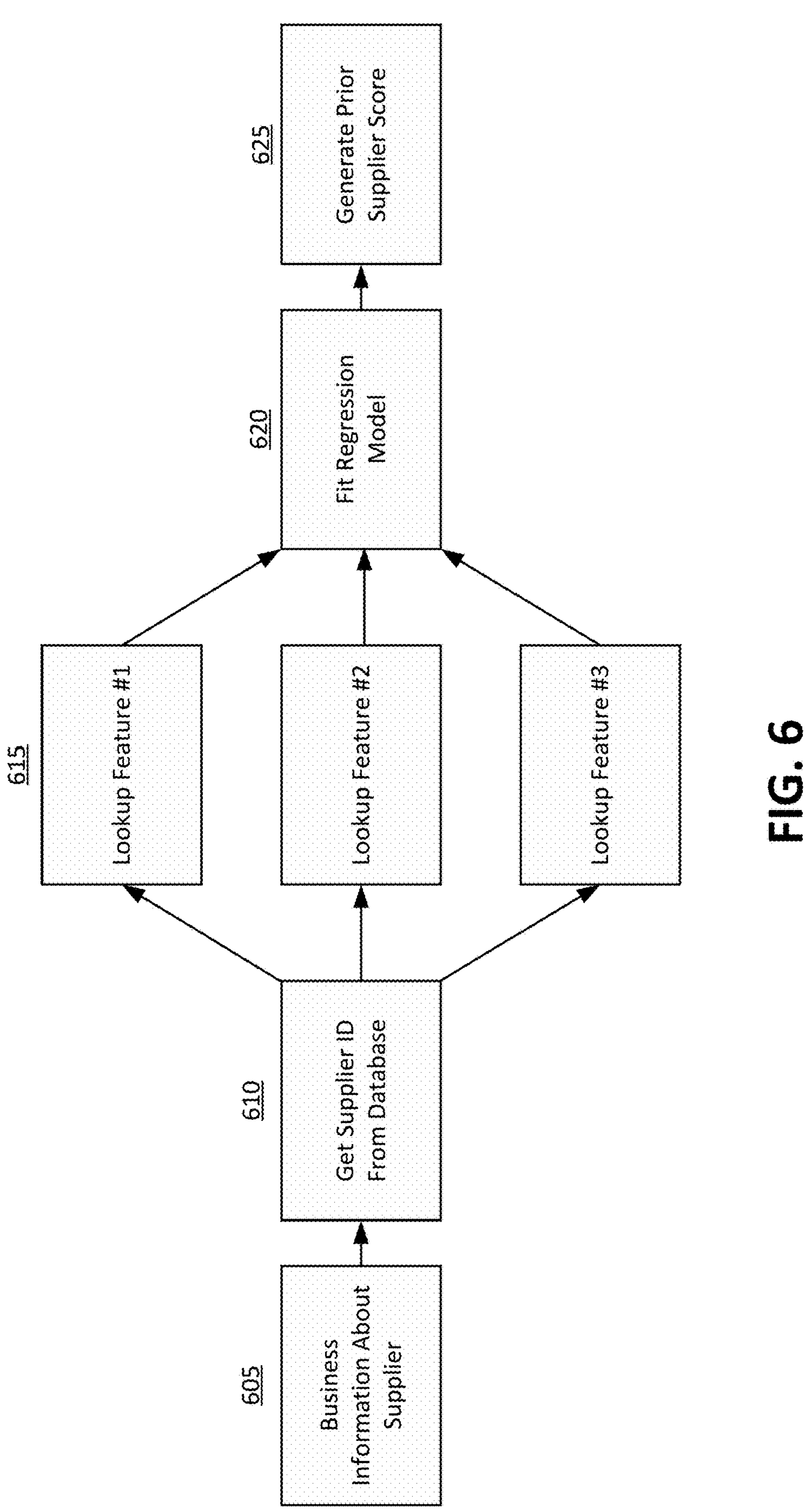
FIG. 6 is a method flowchart illustrating a process according to an exemplary embodiment.
Figure 7:
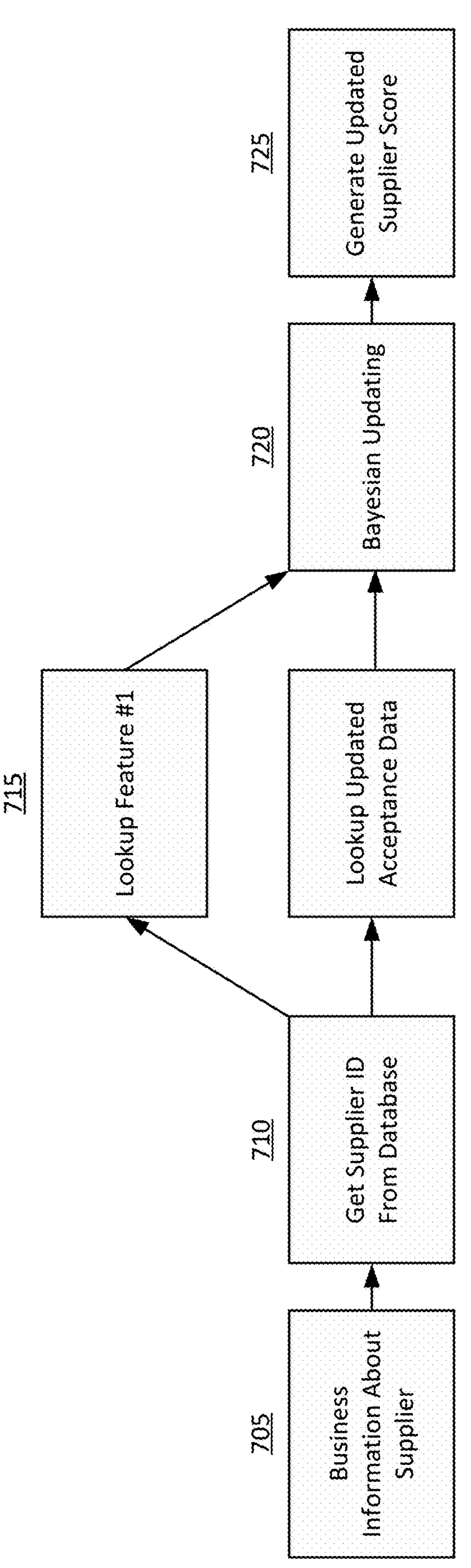
FIG. 7 is a method flowchart illustrating a process according to an exemplary embodiment.

At a high level, the machine learning model comprises of the following steps. Regarding FIG. 6, in action 605, business information about the supplier is gathered, e.g. supplier industry, supplier locations, and past transaction methods accepted by the supplier. Next, in action 610 the system retrieves a business identifier (ID) or supplier ID from an internal database and, within that database, retrieves one or more features about the supplier in one or more actions 615. Next, in action 620 the system fits this information into a regression model which then generates a score indicating a prior transaction acceptance likelihood in action 625. In FIG. 7, in action 705, business information about the supplier is gathered, e.g. supplier industry, supplier locations, and past transaction methods accepted by the supplier. Next, in action 710 the system retrieves a business identifier (ID) or supplier ID from an internal database and, within that database, retrieves one or more features about the supplier in one or more actions 715 as well as any updated acceptance data regarding the supplier. The model can then update the prior transaction acceptance likelihood by again retrieving the business ID from the database, looking up the prior score, looking up an updated data regarding transaction acceptability, and update the model using Bayesian hierarchical modeling in action 720. Ultimately, in action 725 the model can generate an updated supplier score.

Figure 8:
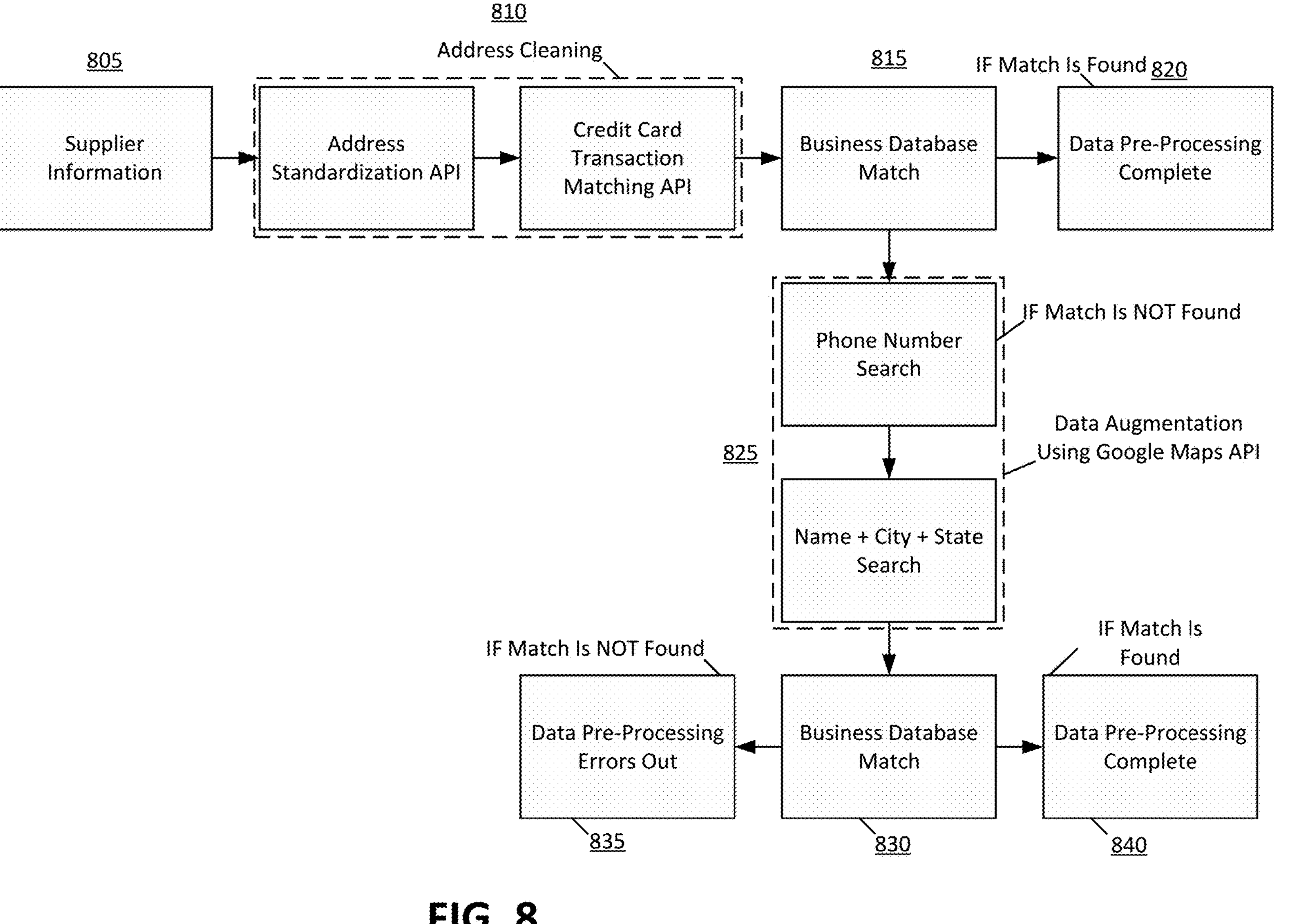
FIG. 8 is a method flowchart illustrating a process according to an exemplary embodiment.

Referring to FIG. 8, this system is concerned with collecting detailed information about one or more suppliers, each of which may have a diverse history of accepting various forms of transactions. For instance, a supplier might have a range of transaction methods, including credit card transactions for specific vendors or wire transfers for certain transactions. Rather than relying on manual outreach such as cold calling to ascertain transaction acceptance details, the system employs a machine learning model to automate the determination of a transaction acceptability score or likelihood. This is achieved by inputting just a few key pieces of information. In action 805, the process begins with the input of supplier information. The inputs can encompass various data points like business name and address. These inputs serve as the foundation for the subsequent analysis. In action 810, to enhance the quality of the data, the supplier information is subjected to address standardization through an Application Programming Interface (API) that streamlines the address format. Additionally, credit card transaction data associated with the supplier can be integrated via another API to bolster the accuracy of the analysis. This combined step of address cleaning ensures that the subsequent stages of the process are built upon reliable and consistent information. Once the address is standardized, in action 815 it is matched against a business match database. If a match is identified, in action 820 the initial data pre-processing is considered complete. This match signifies that the system has successfully linked the supplier to known entities.

However, if no match is found during the initial database matching step, an alternative approach is pursued. The system initiates searches for supplementary information, encompassing a phone number search, as well as searches based on the supplier's name, city, and state in action 825. To facilitate this data augmentation, a geolocation API is employed. This is a pivotal step as it enables the system to harness geographic data and phone number details to potentially identify the supplier even if the initial business database match was unsuccessful. The information is then matched against the business database in action 830. When leveraging the geolocation search, if no match is found in action 835, the process might terminate or reroute for manual review, correction, or other specialized handling. Conversely, if a match is found during the geolocation and phone number search, this implies that the system has successfully associated the supplier with relevant business data in action 840. As a result, the data pre-processing phase reaches completion.

The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as the anticipated future workloads, currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be training prior to use and the training may continue with updated data sets that reflect additional information.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

A batch serving platform can generally be implemented by a system, such as the system 100. For the batch serving platform, data required by the predictive model is obtained from existing databases through lookups or SQL queries. If the required data is not present in a database, a historical outreach table containing outreach data can be created. The output generated by the predictive model can be stored in existing databases or a newly created database.

In contrast, for the real-time serving implementation, data required by the predictive model is also obtained from existing databases through lookups or SQL queries. However, this data needs to be pre-computed and loaded into a separate database or data store that is optimized for fast retrieval to support real-time serving. The historical outreach table must also be available for loading and fast retrieval. Similar to the batch serving platform, the output generated by the predictive model can be stored in existing databases or a newly created database.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Throughout this specification, reference is made to the terms "merchant" and "supplier." It is understood that the present disclosure is not limited to a particular type of merchant or supplier and that the present disclosure can include any type of merchant, supplier, payee, vendor, or other entity involving in activities where products or services are sold or otherwise provided, either online, in a physical location, or both.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

We claim:

1. A system for generating an artificial intelligence model for predicting transaction acceptability, comprising:

a memory for storing organized data comprising merchant and transaction data;

at least one processor communicatively coupled to the memory and configured to:

receive at least one payfile input;

generate artificial intelligence model training data by creating a data package comprising supplier data enriched with card source data and supplier industry data, as well as supplier outreach results data from the at least one payfile input;

set a plurality of model weights based on a plurality of connections between a plurality of hidden layers in the artificial intelligence model;

analyze, via the artificial intelligence model, the artificial intelligence model training data with the plurality of model weights;

adjust the plurality of model weights based on an output of the analysis;

generate a finalized artificial intelligence model based on the output of the analysis and adjusted plurality of model weights;

generate at least one transaction acceptability prediction with the finalized artificial intelligence model; and update the at least one transaction acceptability prediction without refitting the finalized artificial intelligence model by:

generating a prior transaction acceptability score using the finalized artificial intelligence model, collecting updated supplier transaction acceptance information, and combining the prior transaction acceptability score with the updated supplier transaction acceptance information using Bayesian updating to generate an updated transaction acceptability score.

2. The system of claim 1, wherein the generated transaction acceptability prediction is updated in real-time based on an updated payfile input.

3. The system of claim 1, wherein the transaction acceptability prediction is generated for a supplier without historical transaction data.

4. The system of claim 1, wherein the acceptability prediction is generated for an individual transaction.

5. The system of claim 1, wherein the at least one payfile input is converted into a standardized format.

6. The system of claim 1, wherein the supplier outreach results data comprises results of one or more of (1) a prior attempt to determine a supplier transaction acceptability and (2) a prior payment attempt.

7. The system of claim 1, wherein the card source data comprises one or more of (1) records of supplier transactions, (2) records of historical transactions between a supplier and a buyer, and (3) one or more unique values used to categorize the supplier data.

8. The system of claim 1, wherein the supplier industry data comprises a North American Industry Classification System code.

9. A method for generating an artificial intelligence model for predicting transaction acceptability, comprising:

receiving, via a processor, at least one payfile input;

generating, via the processor, artificial intelligence model training data by creating a data package comprising supplier data enriched with card source data and supplier industry data, as well as supplier outreach results data from the at least one payfile input;

setting, via the processor, a plurality of model weights based on a plurality of connections between a plurality of hidden layers in the artificial intelligence model;

analyzing, via the artificial intelligence model, the artificial intelligence model training data with the plurality of model weights;

adjusting, via the processor, the plurality of model weights based on an output of the analysis;

generating, via the processor, a finalized artificial intelligence model based on the output of the analysis and adjusted plurality of model weights;

generating, via the processor, at least one transaction acceptability prediction with the finalized artificial intelligence model; and updating, via the processor, the at least one transaction acceptability prediction without refitting the finalized artificial intelligence model by:

generating a prior transaction acceptability score using the finalized artificial intelligence model, collecting updated supplier transaction acceptance information, and combining the prior transaction acceptability score with the updated supplier transaction acceptance information using Bayesian updating to generate an updated transaction acceptability score.

10. The method of claim 9, wherein the generated transaction acceptability prediction is updated in real-time based on an updated payfile input.

11. The method of claim 9, wherein the transaction acceptability prediction is generated for a supplier without historical transaction data.

12. The method of claim 9, wherein the acceptability prediction is generated for an individual transaction.

13. The method of claim 9, wherein the at least one payfile input is converted into a standardized format.

14. The method of claim 9, wherein the supplier outreach results data comprises results of one or more of (1) a prior attempt to determine a supplier transaction acceptability and (2) a prior payment attempt.

15. The method of claim 9, wherein the card source data comprises one or more of (1) records of supplier transactions, (2) records of historical transactions between a supplier and a buyer, and (3) one or more unique values used to categorize the supplier data.

16. The method of claim 9, wherein the supplier industry data comprises a North American Industry Classification System code.

17. A non-transitory computer-accessible medium having stored thereon computer-executable instructions wherein, when a computer hardware arrangement executes the instructions, the computer hardware arrangement is configured to perform procedures comprising:

receiving, via a processor, at least one payfile input;

generating, via the processor, artificial intelligence model training data by creating a data package comprising supplier data enriched with card source data and supplier industry data, as well as supplier outreach results data from the at least one payfile input;

setting, via the processor, a plurality of model weights based on a plurality of connections between a plurality of hidden layers in the artificial intelligence model;

analyzing, via an artificial intelligence model, the artificial intelligence model training data with the plurality of model weights;

adjusting, via the processor, the plurality of model weights based on an output of the analysis;

generating, via the processor, a finalized artificial intelligence model based on the output of the analysis and adjusted plurality of model weights;

generating, via the processor, at least one transaction acceptability prediction with the finalized artificial intelligence model; and updating, via the processor, the at least one transaction acceptability prediction without refitting the finalized artificial intelligence model by:

generating a prior transaction acceptability score using the finalized artificial intelligence model, collecting updated supplier transaction acceptance information, and combining the prior transaction acceptability score with the updated supplier transaction acceptance information using Bayesian updating to generate an updated transaction acceptability score.

18. The non-transitory computer-accessible medium of claim 17, wherein the generated transaction acceptability prediction is updated in real-time based on an updated payfile input.

19. The non-transitory computer-accessible medium of claim 17, wherein the transaction acceptability prediction is generated for a supplier without historical transaction data.

20. The non-transitory computer-accessible medium of claim 17, wherein the acceptability prediction is generated for an individual transaction.

* * * * *